Sept. 15, 1942.  J. MURRAY  2,295,859

KNIFE SHARPENER

Filed Jan. 2, 1941

INVENTOR.
JOHN MURRAY
BY Chester Tietig
ATTORNEY

Patented Sept. 15, 1942

2,295,859

UNITED STATES PATENT OFFICE 2,295,859

KNIFE SHARPENER

John Murray, Cincinnati, Ohio, assignor of thirty-five per cent to Chester Tietig, Cincinnati, Ohio Application January 2, 1941, Serial No. 372,798

2 Claims. (Cl. 51—205)

This invention relates to a knife sharpener. Among the objects of the invention are to provide a sharpener of the character described, which is detachably retained in the butt of a knife handle and in which the sharpener forms a continuation of the knife handle. Another object is to provide a sharpener that will be of assistance to the knife when the latter is manipulated during cutting, by reason of the balance provided to the knife by the weight and position of the sharpener. Another object is to provide a combination that is peculiarly adapted to mass production through its adaptability to being molded in plastics.

In the drawing, Figure 1 is a side perspective view of the sharpener embodied in a knife handle.

Figure 1:
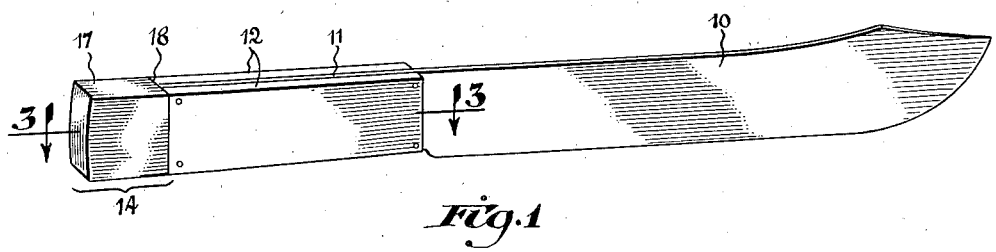
Figure 2:
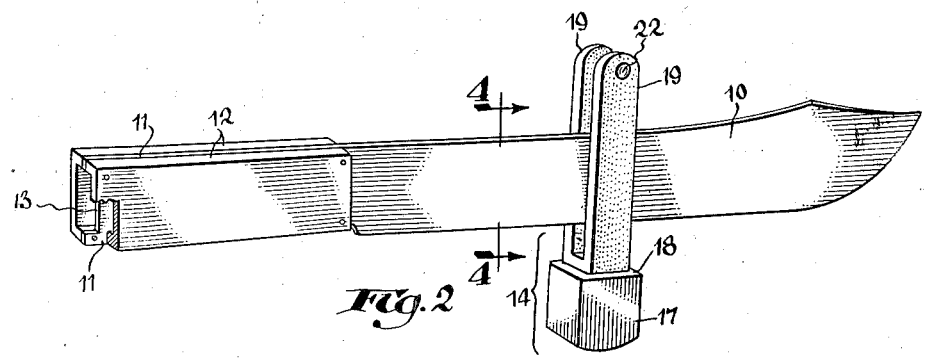
Figure 2 is a similar view except that the butt of the knife handle is partially broken away to show its inner construction. The sharpener is shown in sharpening position on the blade.
Figure 5:
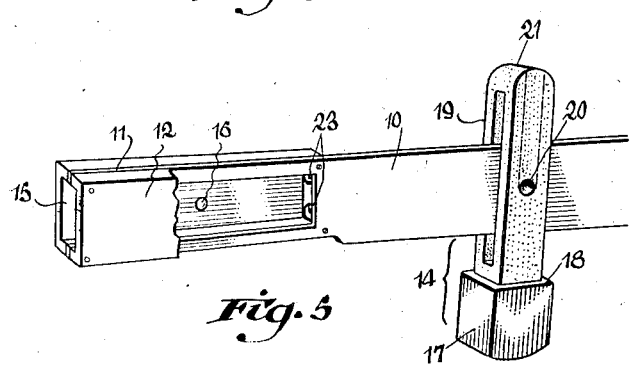
Figure 5 is a view corresponding to Figure 2 in which the forward portion of one side of the handle is broken away to show the holding device, and showing a modified form of sharpener.

In the drawing, 10 is a knife blade having a tang 11. About the tang are assembled two halves, right and left respectively, of a handle 12. The tang 11 extends preferably as far back as the handle but is cut away at the butt of the handle as shown at 13 in Figure 2. The cut away portion is shaped to accommodate the sharpener 14 also shown in Figure 2 as straddling the blade 10. It is to be understood that the cross section of the handle is box-like as shown in Figures 2 and 5, therefore an opening 14 of considerable size is left in the handle for the accommodation of the sharpener. In the forms shown in Figures 2 and 3, the tang 11 bisects the opening 14 longitudinally.

In the form shown in Figure 5, the central portion of the tang is cut away, leaving only the edges thereof within the handle. This construction is for the purpose of accommodating a modified form of sharpener 14 as shown in Figure 5.

While the knife handle may be made in one piece, I prefer to mold it from plastic in halves as shown for the reason that I may then without difficulty mold upon the inner surface a retaining button 16 which may be in the forward part of the handle as shown in Figure 5.

The sharpener comprises a butt portion 17 which is preferably, although not necessarily, of the same height and thickness as the knife handle 12. The portion 17 has a preferably sharp shoulder 18 from which project two blades 19, which in the preferred form of the invention are made of plastic and are somewhat springy. The blades 19 have an inner surface which is abrasive; the outer surface may instead be abrasive, for both inner and outer surfaces may be abrasive. It is also preferable to have the surfaces of one blade both abrasive and the inner surface of the other blade abrasive while the outer surface of that blade is smooth. In such case as shown in Figure 5, the smooth surface bears a depression 20 which is adapted to cooperate with button 16 to form a detent or holding device whereby the shoulder 18 is held in close contact with the butt end of the knife handle.

Figure 4:
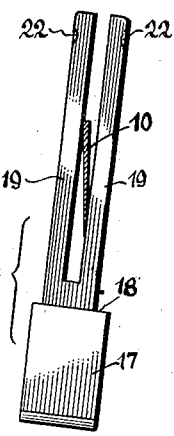
Figure 4 is a sectional view taken along the line 4—4 of Figure 2.

The abrasive character of the blades 19 may be created in three ways. The first and simplest of these is to paste with waterproof glue or synthetic resin varnish, a strip of abrasive paper on the surface which it is desired to render abrasive. The second way which is the preferred way as regards Figure 4 is to incorporate a considerable percentage, say 40 to 80% by weight of abrasive grain, for instance "Carborundum," in the plastic material of which the sharpener for the blades thereof are made. The third way which is adapted to the construction of the sharpener shown in Figure 5 is to have the entire sharpener made of "Carborundum." Since solid "Carborundum" is not flexible, for such a sharpener, a closed end 21 is provided to prevent the blades from flexing. However, it is to be understood that the form of sharpener shown in Figure 5 can also be made in plastic with or without incorporated abrasive.

In the form shown in Figure 4, there are grooves 22 extending crosswise on the blades 19 near the tops thereof. These grooves cooperate with buttons or ridges 16 on the inner side of the handle valves 12 to provide a holding device which has a more or less elastic disengagement. As shown in Figure 2, the grooves 22 may be merely depressions 20.

When the sharpener of the form shown in Figure 4 is stowed in the handle of the type shown in Figure 2, the blades 19 straddle the knife blade 10 and extend into the handle 12 until engagement between the parts of the locking device 16 and 20 or 22 is complete. In the case of Figure 5, the tang 11 of the knife is not straddled and engagement of the locking device takes place at the approximate center of the blade 19. In order to avoid wearing down the button 16 by the action of the "Carborundum," the outer surface of the blade 19 which bears the depression 20 may be provided with a smooth surface by having glued there over a smooth sheet of paper or it may be provided with a coating of smooth hard varnish or resin.

In order to use the sharpener, the knife blade is straddled as shown in Figures 2, 4 and 5 in the blade and sharpener are canted against each other as shown in Figure 4 while the sharpener is worked back and forth along the blade. First one side of the blade is canted against the sharpener and then the other, thereby producing an acute angled edge, the acuity of which is governed by the distance between the blades 19 and the width of the knife blade. For such knives as might be of the wrong breadth to produce a correctly angled edge, the outer abrasive surface of the blade 19 may be used in the same manner as a butcher's steel.

Figure 3:
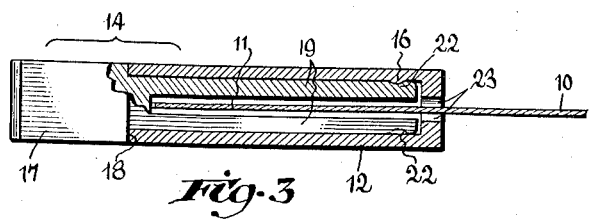
Figure 3 is a plan sectional view taken along the line 3—3 of Figure 1.

As shown in Figure 3, I prefer to mold small grooves 23 into the forward ends of the knife handle halves for the purpose of allowing water to drain out of the handle. This permits the knife to be washed in soap water without the interior of the handle becoming foul or corroded.

Since my sharpener is capable of being used to sharpen any knife, regardless of whether provision is made in the handle of that knife for holding the sharpener, or not, I regard my sharpener as an invention in itself.

I claim as my invention:

1. A knife sharpener comprising a handle or butt portion, two blade portions extending forwardly from said butt portion so as to enclose a long narrow slot between said blade portions and a forward portion joining the tops of said blade portions, said blade portions having abrasive surfaces.

2. A knife sharpener according to claim 1, having a substantially circular depression in the outer surface of one of said blade portions, said depression being adapted to cooperate with a fitting raised portion on the inner surface of the handle of a knife to provide a detent, and smooth sheet material of a deformable character adhesively attached to the outer surface of the blade bearing the depression whereby to provide a smooth surface on said blade so that the raised portion within the knife handle can glide along the blade surface to enter said depression without being materially abraded.

JOHN MURRAY.